United States Patent [19]

Akiyama et al.

[11] Patent Number: 4,910,789
[45] Date of Patent: Mar. 20, 1990

[54] APPARATUS FOR CONTROLLING THE ADJUSTMENT RATE OF A LENS ASSEMBLY

[75] Inventors: Mamoru Akiyama; Hirotaka Shiroshita; Toshikatsu Atsuta, all of Tokyo; Nobuaki Murai; Takayoshi Morooka, both of Nagano, all of Japan

[73] Assignee: Kyocera Corporation, Kyoto, Japan

[21] Appl. No.: 254,270

[22] Filed: Oct. 5, 1988

[30] Foreign Application Priority Data

Oct. 7, 1987 [JP] Japan .................................. 62-253398

[51] Int. Cl.$^4$ .............................................. G05B 1/06
[52] U.S. Cl. .................................... 388/811; 318/640; 318/475; 388/810
[58] Field of Search ............... 318/269, 606, 607, 475, 318/480, 640; 388/200, 804, 809–811, 845

[56] References Cited

U.S. PATENT DOCUMENTS

| | | | |
|---|---|---|---|
| 4,041,362 | 8/1977 | Ichiyanagi | 318/269 |
| 4,157,489 | 6/1979 | Tal | 318/606 |
| 4,457,639 | 7/1984 | Nagai | 318/607 X |
| 4,489,260 | 12/1984 | Matsushita | 318/685 X |
| 4,575,246 | 3/1986 | Nishizawa et al. | 318/640 X |
| 4,647,169 | 3/1987 | Suzuki et al. | 226/40 X |
| 4,675,589 | 6/1987 | Sausner et al. | 318/606 X |

Primary Examiner—William M. Shoop, Jr.
Assistant Examiner—A. Jonathan Wysocki
Attorney, Agent, or Firm—Spensley Horn Jubas & Lubitz

[57] ABSTRACT

A constant speed driving apparatus comprises a starting means for starting a control unit, the first pulse-generating means for generating the first pulse signal with a predetermined frequency, a driving mechanism for driving a load, the second pulse-generating means for generating the second pulse signal corresponding to driving speed of the driving mechanism, and the control unit for controlling the driving mechanism on the basis of the first and second pulse signals.

6 Claims, 5 Drawing Sheets

APPARATUS FOR CONTROLLING THE ADJUSTMENT RATE OF A LENS ASSEMBLY

BACKGROUND OF THE INVENTION

The present invention relates to an apparatus for performing speed control of a mechanism, and more particularly relates to an apparatus for driving a zoom lens assembly with constant speed.

A mechanical cam assembly for a zoom lens is well known in the prior art in which the focal length is continuously changed from telephoto to wide angle and vice versa by moving a pin mounted on a lens pin barrel along a cam groove. In this kind of technique, as the mechanism should be made from metal, it results in material and production cost increases. To solve the difficulty stated above, a new improvement was disclosed in Japanese Patent Application No. 40108/87, in which a mechanism made from plastic was employed. In the disclosure, in order to make the molding process easier, instead of the cam groove a pin of a lens pin barrel is pressed and slid on one of cam surfaces by means of a spring. In this manner of technique, the moving speed of lens barrel assembly varies with its moving direction corresponding to expansion or contraction of the spring. This brings an operational difficulty in zooming and also gives a visual problem through a view finder.

SUMMARY OF THE INVENTION

The present invention is intended to overcome the previously stated problems. Therefore, an object of the present invention is to provide a constant speed driving apparatus which realizes smooth zooming operation without depending upon the zooming direction. A constant speed driving apparatus according to the present invention comprises:

(a) starting means for starting a control unit;
(b) first pulse-generating means for generating the first pulse signal with a predetermined frequency;
(c) a driving mechanism for driving a load;
(d) second pulse-generating means for generating the second pulse signal corresponding to driving speed of the driving mechanism; and
(e) the control unit to which the first and second pulse signals are inputted from the respective first and second pulse-generating means, for controlling the driving mechanism.

Other and further objects, features and advantages of the present invention will appear more fully from the following description taken in connection with the accompanying drawings.

DESCRIPTION OF THE PREFERRED EMBODIMENT

An embodiment of the present invention will be described with reference to the accompanying drawings.

Figure 1:
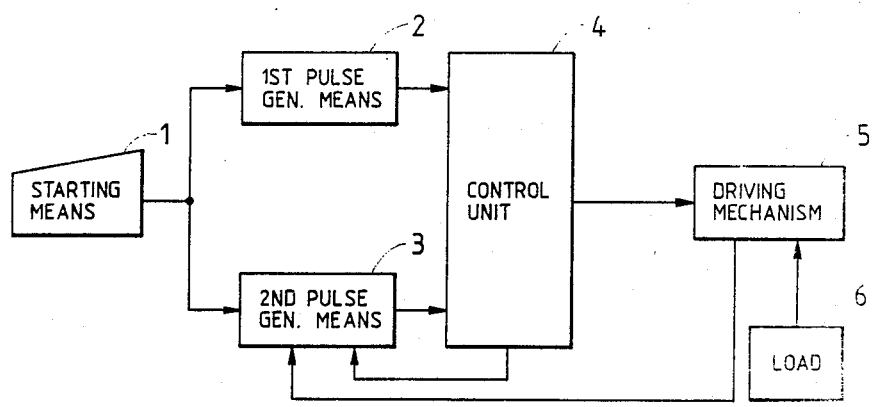
FIG. 1 is a block diagram showing the constitution of a constant speed driving apparatus according to the present invention.

FIG. 1 is a block diagram showing the general constitution of a constant speed driving apparatus according to the invention. Moving speed of a lens barrel is electronically controlled means of a control unit 4.

Figure 2:
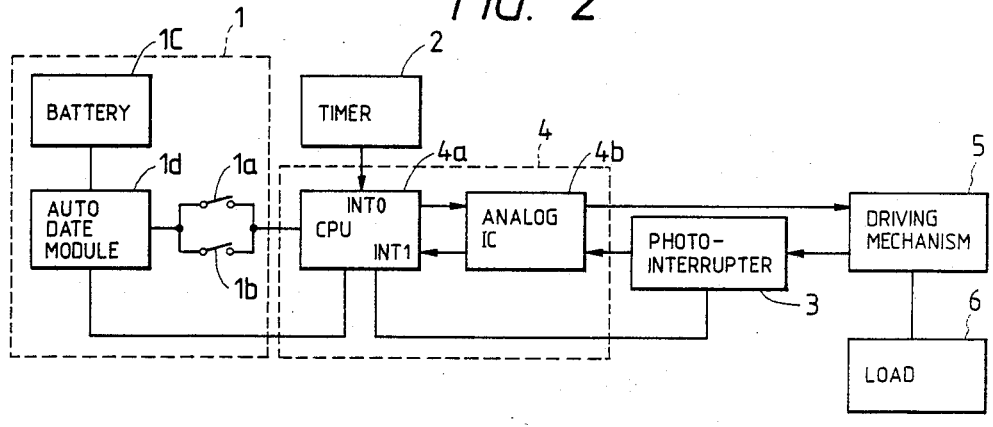
FIG. 2 is a block diagram showing in further detail the constitution of the driving apparatus of FIG. 1.
Figure 3:
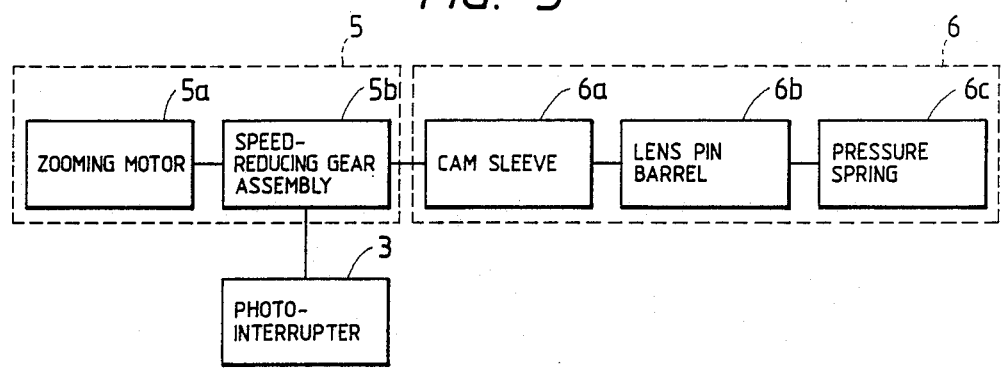
FIG. 3 is a structural diagram to explain the operation of a photo-interrupter and a pressure spring included in FIG. 2.

FIG. 2 is a block diagram showing in further detail the constitution of the driving apparatus of FIG. 1. FIG. 3 is a block diagram to explain the operation of a photo-interrupter and a pressure spring included in FIG. 2.

As shown in FIG. 3, a driving mechanism 5 comprises a zooming motor 5a, a speed-reducing gear assembly 5b. A load 6 consists of a cam sleeve 6a, a lens pin barrel 6b, and a pressure spring 6c.

Figure 4:
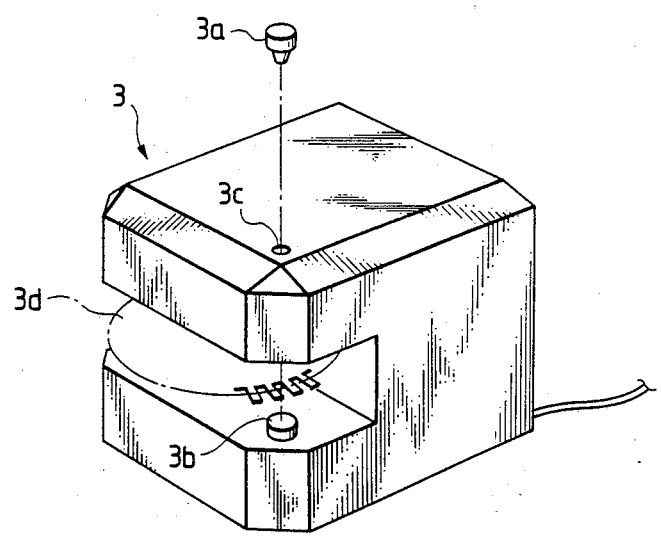
FIG. 4 is a structural view showing in further detail the photo-interrupter shown in FIG. 3.

As shown in FIG. 4, the photo-interrupter 3 comprises an LED 3a, a photocell 3b, a through hole 3c and a slit plate 3d.

An auto-date module 1d in FIG. 2 gives a command to a micro processor 4a (which will be called hereinafter as CPU) to start an operating process when it detects that either a Tele (telephoto) switch 1 or a Wide (wide angle) switch 1b is turned on. The CPU 4a turns on the LED 3a of the photointerrupter 3, and at the same time it turns on the zooming motor 5a through an analog IC 4b. The CPU 4a can distinguish two kinds of interruption signals INT0 and INT1, where the former is outputted from a timer 2 and the latter from the photo-interrupter 3. As the interruption signal INT0 from the timer is of a software-based one, it can be set to an arbitrary value. It is programmed to be sent in every predetermined time interval to the CPU 4a.

The interruption signal INT1 from the photointerrupter 3 is explained with reference to a structural view shown in FIG. 4. The LED 3a which has already been "ON" is located right above the through hole 3c of the photo-interrupter 3. The rotational slit plate 3d with notches on its circumference is built in a dent portion of the photo-interrupter 3. According to the rotation of the slit plate 3d, the light path through the through hole 3c is alternately shut and opened. When the light path is opened, the photocell 3b detects light and a corresponding current flows through an emitter so that the interruption signal INT1 is supplied to the CPU 4a through the analog IC 4b.

Hereinafter the relation between the photointerrupter 3 and the pressure spring 6c will be explained with reference to FIG. 3. The slit plate 3d of the photointerrupter 3 is rotated by the zooming motor 5a. A load onto the zooming motor 5a from the pressure spring 6c which is transferred through the lens pin barrel 6b, the cam sleeve 6a and the speed-reducing cam assembly 5b varies with an expansion or contraction degree of the pressure spring 6c. When the Tele switch 1a is turned on, the pressure spring 6c contracts to perform the zooming toward Tele-side. When the Wide switch 1b is turned on, the pressure spring 6c expands to perform the zooming toward Wide-side. A straight movement of the pressure spring 6c is transformed to a rotational movement through the speed-reducing gear assembly 5b.

Hence, the rotational speed of the slit plate 3d is proportional to the expansion or contraction degree of the pressure spring 6c.

When the CPU 4a detects the interruption signal INT0 from the timer 2, it turns the zooming motor 5a "ON", and when it detects the interruption signal INT1 from the photo-interrupter, it turns the zooming motor 5a "OFF" through the analog IC 4b.

Figure 5A:
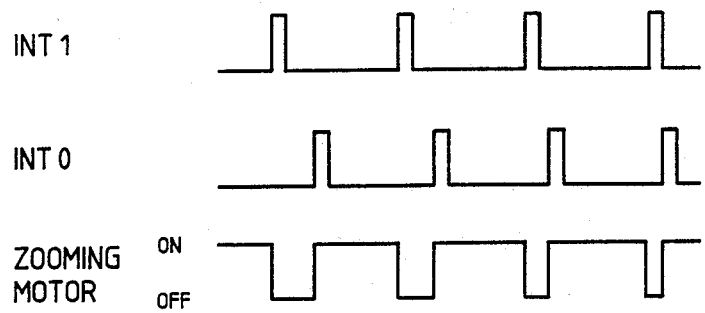
FIGS. 5(a) and 5(b) are pulse waveforms to explain the operation of the block diagram of FIG. 2.
Figure 5B:
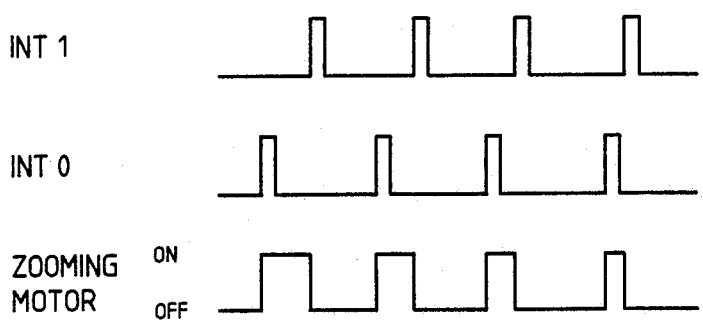

Hereinafter the operation of the driving apparatus of FIG. 2 will be explained with reference to the pulse waveforms shown in FIGS. 5(a) and 5(b). FIG. 5(a) corresponds to the control toward the Tele-side, and FIG. 5(b) corresponds to the control toward the Wide-side.

In the zooming operation toward Tele-side, as the load of the pressure spring 6c becomes heavier, the rotation speed of the slit plate 3d of the photointerrupter 3 which is indirectly connected to the pressure spring 6c becomes slower in proportion to the load, so that the light-receiving period of the photocell 3b becomes longer. As a result, the period of INT1 becomes longer and, therefore, the zooming motor 5a is turned off with the longer period. This causes longer average duration of the "ON" state of the zooming motor 5a;

On the other hand, in the zooming operation toward Wide-side, as the load of the pressure spring 6c becomes lighter, the average duration of the "ON" state of the zooming motor 5a becomes shorter.

As described above, the constant driving speed can be attained irrespective of the driving direction by turning on the zooming motor 5a with the constant period (INT0) and turning it off with the variable period (INT1) which is longer in case the load is heavier (toward Teleside) and shorter in case the load is lighter (toward Wide-side).

Figure 6A:
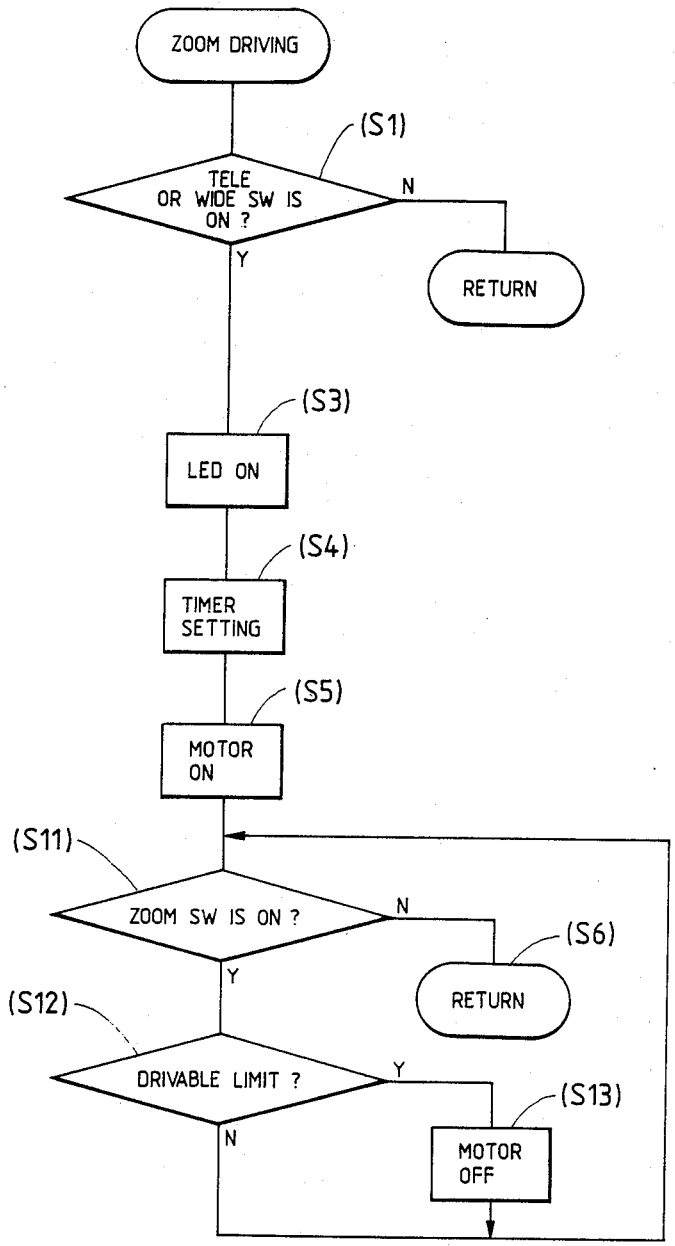
FIG. 6(a) is a flow chart showing a main routine performed in a CPU shown in FIG. 2.

Hereinafter, the control procedure (software) to control the mechanism so as to be operated as described above will be explained with reference to FIG. 6. As shown in FIG. 6(a), when either the Tele switch or Wide switch is turned "ON" at the step S1, the CPU turns on the LED at the step S3 and sets the value of timer length at the step S4, and then turns on the motor at the step S5. If one of the zoom switches (Tele, Wide) is ON at the step S11 and if the mechanism has reached its drivable limit at the step S12, the motor is turned off at the step S13. If the mechanism is within its drivable limit at the step S12, the program goes back to the step S11. If neither switch is ON at the step S11, the program is returned at the step S6.

Figure 6B:
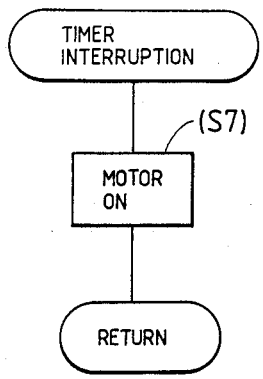
FIGS. 6(b) and 6(c) are flow charts showing respective interruption routines performed in a CPU shown in FIG. 2.
Figure 6C:
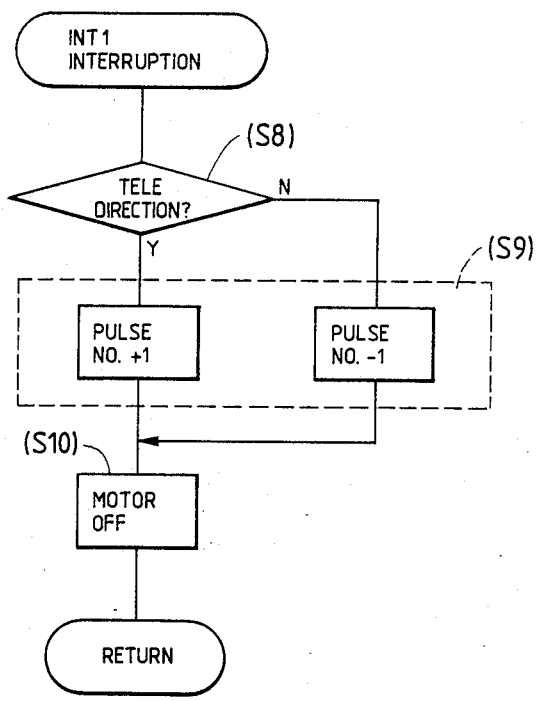

As shown in FIG. 6(c), if the interruption signal INT1 from the photo-interrupter is received, the CPU judges whether the mechanism is operating toward the Teleside or Wide-side at the step S8, and sets the pulse number at the step S9. Then it turns off the motor at the step S10 and the program is returned. As shown in FIG. 6(b), if the interruption signal INT0 from the timer is received, the CPU turns on the motor at the step S7 and the program is returned.

As was described above, the driving apparatus which is incorporated with the present invention can realize the natural zooming operation with the constant zooming speed which does not depend upon the zooming direction. Any driving mechanism can be associated with the constant speed driving apparatus of the invention. In addition to the above stated improvement, the optimum zooming speed can be selected by changing the rotational speed of the motor through the selection of the timer constant. As the zooming operation is controlled not mechanically but electronically (by the CPU), the lower cost and the higher reliability can be attained.

What is claimed is:

1. A constant speed driving apparatus, comprising:
   starting means for starting a control unit;
   first pulse-generating means for generating a first pulse signal with predetermined frequency, wherein said first pulse-generating means is a software timer;
   a driving mechanism for driving a load;
   second pulse-generating means for generating a second pulse signal corresponding to driving speed of said driving mechanism; and
   said control unit to which said first and second pulse signals are inputted from said respective first and second pulse-generating means, for controlling said driving mechanism on the basis of said first and second pulse signals.

2. A constant speed driving apparatus as claimed in claim 1, wherein said control unit turns on said driving mechanism on receiving a pulse of said first pulse signal, and turns off said driving mechanism on receiving a pulse of said second pulse signal.

3. A constant speed driving apparatus as claimed in claim 1, wherein said starting means comprises switch means for designating a driving direction and starts said control unit in response to an operation of said switch means, and said control unit controls said driving mechanism further on the basis of said driving direction designated by said switch means.

4. A constant speed driving apparatus as claimed in claim 1, wherein said second pulse-generating means is a photo-interrupter comprising a rotational slit plate for opening and shutting a light path, which is driven by said driving mechanism.

5. A constant speed driving apparatus, comprising:
   starting means for starting a control unit;
   first pulse-generating means for generating a first pulse signal with predetermined frequency;
   a driving mechanism for driving a load;
   second pulse-generating means for generating a second pulse signal corresponding to driving speed of said driving mechanism, wherein said second pulse-generating means is a photo-interrupter comprising a rotational slit plate for opening and shutting a light path, which is driven by said driving mechanism; and
   said control unit to which said first and second pulse signals are inputted from said respective first and second pulse-generating means, for controlling said driving mechanism on the basis of said first and second pulse signals.

6. A constant speed driving apparatus as claimed in claim 5 wherein said first pulse-generating means is a software timer.

* * * * *